United States Patent
Halloran et al.

(10) Patent No.: US 8,288,055 B2
(45) Date of Patent: Oct. 16, 2012

(54) FUEL CELL SYSTEM HAVING A HYDROGEN SEPARATION MEMBER

(75) Inventors: John W. Halloran, Ann Arbor, MI (US); Timothy LaBreche, Ann Arbor, MI (US); Shaowu Zha, Ann Arbor, MI (US); Aaron T. Crumm, Ann Arbor, MI (US)

(73) Assignee: Adaptive Materials, Inc., Ann Arbor, MI (US)

( * ) Notice: Subject to any disclaimer, the term of this patent is extended or adjusted under 35 U.S.C. 154(b) by 749 days.

(21) Appl. No.: 12/321,219

(22) Filed: Jan. 20, 2009

(65) Prior Publication Data

US 2010/0183937 A1 Jul. 22, 2010

(51) Int. Cl.
*H01M 8/06* (2006.01)
*H01M 8/10* (2006.01)
*H01M 2/18* (2006.01)

(52) U.S. Cl. .................. 429/497; 429/411; 429/466

(58) Field of Classification Search .......... 429/400–535
See application file for complete search history.

(56) References Cited

U.S. PATENT DOCUMENTS

| | | | | |
|---|---|---|---|---|
| 5,366,712 A | * | 11/1994 | Violante et al. | 423/248 |
| 5,976,724 A | * | 11/1999 | Bloomfield | 429/425 |
| 6,630,116 B2 | | 10/2003 | Balachandran et al. | |
| 2005/0112452 A1 | | 5/2005 | Crumm et al. | |
| 2005/0123810 A1 | | 6/2005 | Balan | |
| 2006/0228593 A1 | | 10/2006 | Grieve et al. | |
| 2008/0241612 A1 | | 10/2008 | Ballantine et al. | |

OTHER PUBLICATIONS

Zuo et al. "Composite Ni-Ba(Zr0.1Ce0.7Y0.2)O3 membrane for hydrogen separation." Journal of Power Sources 159.2(2006): 1291-295.*

U. Balachandran et. al., Development of Mixed-Conducting Ceramics for Gas Separation Applications, Symposium on Solid State Ionics, Materials Research Society Fall Meeting,p. 1-6, Nov. 30-Dec. 4, 1998, Boston, MA.

(Continued)

*Primary Examiner* — Basia Ridley
*Assistant Examiner* — James Lee
(74) *Attorney, Agent, or Firm* — Endurance Law Group PLC (57) ABSTRACT

A fuel cell stack configured to input raw fuel from a fuel source to produce electrical energy includes a fuel cell comprising an anode, an electrolyte, and a cathode. The anode defines an anode chamber, and a hydrogen separation member is disposed within the anode chamber. The hydrogen separation member has a first side and a second side. The first side of the hydrogen separation member defines a raw fuel chamber. The hydrogen separation member transfer hydrogen between the first side and the second side to provide hydrogen fuel to the anode of the fuel cell, while inhibiting the transportation of gas molecules between the first side and the second side.

19 Claims, 8 Drawing Sheets

OTHER PUBLICATIONS

C. Kokkofitis et. al., Catalyst and electrocatalytic production of H2 from the water shift reaction over Pd in a high temperature proton-conducting cell-reactor, Solid State Ionics 178 (2007) 475-480, Elsevier B.V.

R.V. Siriwardane et. al., Characterization of ceramic hydrogen separation members with varying nickel concentrations, Applied Surface Science 167 (2000) 34-50, Elsevier Science B.V.

Guangyao Meng, Ceramic membrane fuel cells based on solid proton electrolyte, Solid State Ionics 178 (2007) 697-703, Elsevier B.V.

W. Grover Coors, Protonic ceramic steam-permeable membranes, Solid State Ionics 178 (2006), 481-485, Elsevier B.V.

C. Zuo et. al, $Ba(Zr0.1Ce0.7Y0.2)$ as an Electrolyte for Low-Temperature Solid-Oxide Fuel Cells Advanced Materials 20063318-3320 18, 3318-320, Wiley-VCH Verlag GmbH & Co. KGaA, Weinheim.

U. Balachandran et al., Hydrogen production by water dissociation using mixed conducting dense ceramic membranes, International Journal of Hydrogen Energy, 32 (2007) 451-456.

U. Balachandran et al., Hydrogen separation by dense cermet membranes, Fuel, 85 (2006) 150-155.

\* cited by examiner

FUEL CELL SYSTEM HAVING A HYDROGEN SEPARATION MEMBER

FIELD OF THE INVENTION

The invention relates to sulfur tolerant solid oxide fuel cell systems.

BACKGROUND

The statements in this section merely provide background information related to the present disclosure and may not constitute prior art.

Fuel cells create an electromotive force across an electrolyte by reacting a fuel, typically hydrogen, at an anode disposed on a first side of the electrolyte, and an oxidant, typically oxygen at a cathode disposed on a second side of the electrolyte.

In portable fuel cell systems, either hydrogen gas or hydrogen and other molecules reformed from hydrocarbons can be utilized for the anode reactions, and oxygen from the atmosphere can be utilized for the cathode reactions. The hydrogen and the hydrocarbons can be stored in a suitable holding tank and transported along with the fuel cell system. Hydrogen gas has a high energy-to-weight ratio but a low energy-to-volume ratio when packaged into a suitable holding tank as compared to hydrocarbon fuels. Therefore, a fuel cell utilizing hydrogen gas requires larger volumes and weights of stored fuel than a fuel cell utilizing hydrocarbon fuel to provide equivalent amounts of energy. Compressing hydrogen gas is inefficient due to the high levels of energy required to compress hydrogen. Further, compressed gas hydrogen storage requires storage containers having structural components with sufficient strength to retain the hydrogen under the desired pressure levels. The structural components add significant weight to compressed gas hydrogen storage containers, thereby offsetting efficiencies gained by the high energy per unit weight that is storable by hydrogen gas.

Alternative hydrogen storage methods include solid state storage and cryogenic liquid storage. Currently, solid-state hydrogen storage materials such as metal hydrides and fullerene-based materials have shown only low levels of hydrogen storage capacity, for example, reversible hydrogen storage levels of less than three weight percent and require costly materials. Cryogenic liquid storage of hydrogen requires costly equipment and utilizes high amounts of energy to maintain the sufficiently low temperatures required to provide hydrogen in a liquid state.

Another method of hydrogen storage includes chemical hydrides which are also limited in the ability to package hydrogen in a manner that provides equivalent amounts of energy as hydrocarbon fuel sources.

Due to limitations in current hydrogen storage methods, utilizing hydrocarbon-based fuel in fuel cells can provide advantages over utilizing hydrogen stored in molecular and solid-state form. Hydrocarbon-based fuel, as used herein, refers to any of a broad range of molecules containing hydrogen and carbon utilized in fuel and can include oxygenated hydrocarbons such as alcohols and glycols. Hydrocarbon fuels have high energy-to-volume ratios when compared to hydrogen gas and can be stored utilizing inexpensive storage containers when compared to compressed gas or liquid hydrogen. Further, hydrocarbons have a high energy-to-weight ratio and can be stored utilizing inexpensive storage systems when compared to solid-state hydrogen storage systems.

Reactants for the fuel cell including hydrogen and carbon monoxide can be liberated from hydrocarbon fuels in a fuel reformer. The fuel reformer can comprise catalyst material that catalyzes the reaction between oxygen and the hydrocarbon fuel to partially oxidize the hydrocarbon fuel and generate hydrogen. Atmospheric oxygen can be provided to the fuel reformer. Further, water vapor present in the fuel reformer can react with carbon monoxide fuel to generate hydrogen.

Certain standard hydrocarbon fuels contain substances that can poison or can reduce operational efficacy of fuel cell components. For example, diesel fuel and military JP-8 fuel can include sulfur containing molecules that can degrade fuel cell anode materials.

Further, reformed hydrocarbon fuel contains other substances that can reduce the operational efficacy of the fuel cell. In addition to hydrogen molecules that can be oxidized at the anode of the fuel cell to form water, the reformed product gas can include fully oxidized molecules such as carbon dioxide that are not reacted by the fuel cell anode. Further, atmospheric air utilized as the internal reformer oxygen source comprises about eighty percent nitrogen, which is not reacted by the fuel cell anode. The theoretical potential of the half reaction at the anode can be modeled by the Nernst Equation, depicted as Equation 1 below:

$$E = E_O(T, P) - \frac{RT}{zF}\ln\left(\frac{P_{H_2O}}{P_{H_2} \cdot \sqrt{P_{O_2}}}\right) \quad (1)$$

wherein,
E=Theoretical Potential
$E_O(T,P)$=Ideal Potential as a function of temperature and pressure
R=Ideal gas law constant
T=Temperature
z=number of electrons transferred at the electrode
F=Faraday constant
$P_{H_2O}$=Partial pressure of water
$P_{H_2}$=Partial pressure of hydrogen
$P_{O_2}$=Partial pressure of oxygen As shown in Equation 1 above, nitrogen and fully oxidized molecules such as water and carbon dioxide within the reformed fuel reduce the partial pressure of hydrogen or other fuel cell reactant species at the fuel cell anode and therefore reduce the theoretical efficiency of the fuel cell.

SUMMARY

In accordance with an exemplary embodiment, a fuel cell stack configured to input raw fuel from a fuel source to produce electrical energy includes a fuel cell comprising an anode, an electrolyte and a cathode. The anode defines an anode chamber and a hydrogen separation member is disposed within the anode chamber. The hydrogen separation member has a first side and a second side. The first side of the hydrogen separation member defines a raw fuel chamber. The hydrogen separation member conducts hydrogen between the first side and the second side to provide hydrogen fuel to the anode of the fuel cell, while inhibiting the transportation of gas molecules between the first side and the second side.

It should be understood that the appended drawings are not necessarily to scale, presenting a somewhat simplified representation of various preferred features illustrative of the basic principles of the invention. The specific design features of the fuel cell will be determined in part by the particular intended application and use environment. Certain features of the illustrated embodiments have been enlarged or distorted relative to others for visualization and understanding. In particular, thin features may be thickened for clarity of illustration. All references to direction and position, unless otherwise indicated, refer to the orientation of the solid state electrochemical device illustrated in the drawings.

DETAILED DESCRIPTION OF THE EMBODIMENTS

Figure 1:
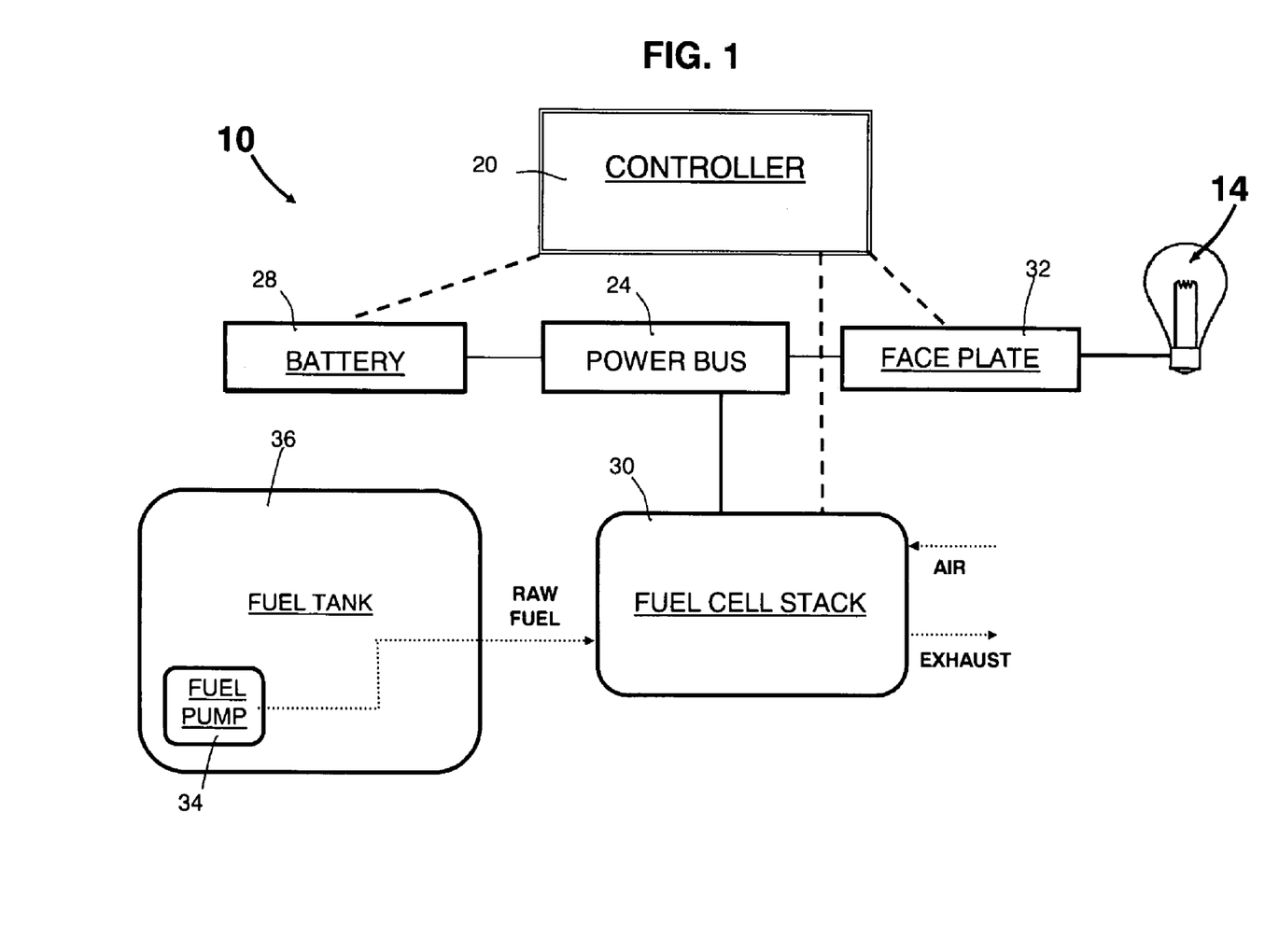
FIG. 1 depicts a schematic diagram of a fuel cell system in accordance with an exemplary embodiment of the present disclosure.

FIG. 1 depicts a fuel cell system 10 electrically coupled to an external device 14. The fuel cell system 10 includes a controller ('CONTROLLER') 20, a power bus ('POWER BUS') 24, a battery ('BATTERY') 28, a fuel cell stack ('FUEL CELL STACK') 30, a face plate ('FACE PLATE') 32, a fuel pump ('FUEL PUMP') 34, and a fuel tank ('FUEL TANK') 36.

The controller 20 comprises a general-purpose digital computer comprising a microprocessor or central processing unit, storage mediums comprising non-volatile memory, a high speed clock, analog-to-digital conversion circuitry, input/output circuitry and devices, and appropriate signal conditioning and buffer circuitry. The controller 20 can execute a set of algorithms comprising resident program instructions to monitor control signals from sensors disposed throughout the fuel cell system 10 and can execute algorithms in response to the monitored inputs to execute diagnostic routines to monitor power flows and component operations of the fuel cell system 10.

The power bus 24 comprises an electrically conductive network configured to route power from the energy conversion devices (the rechargeable battery 28 and the fuel cell stack 30) to the face plate 32. The face plate 32 comprises a plurality of electrical connection ports for connecting external devices 14 to the fuel cell system 10. The exemplary rechargeable battery 28 is configured to receive power from the power bus 24 and to discharge power to the power bus 24.

The fuel tank 36 contains the fuel pump 34 that delivers raw fuel from the fuel tank 36 to the fuel cell stack 30. Raw fuel, as used herein, refers to fuel prior to being processed by a hydrogen separation member 50 as described herein below. Exemplary raw fuels include a wide range of hydrocarbon fuels along with fuel that contains hydrogen along with impurities that are separated from hydrogen by the hydrogen separation member 50. In an exemplary embodiment, the fuel is a mixture comprising combinations of various component fuel molecules, examples of which include gasoline blends, liquefied natural gas, JP-8 fuel and diesel. In alternative embodiments, the raw fuel can comprise one or more other types of fuels, such as alkane fuels, for example, methane, ethane, propane, butane, pentane, hexane, heptane, octane, nonane, decane, along with hydrocarbon molecules with greater numbers of carbon atoms such as cetane, and the like, and can include non-linear alkane isomers. Further, other types of hydrocarbon fuel, such as partially and fully saturated hydrocarbons, and oxygenated hydrocarbons, such as alcohols and glycols, can be utilized as raw fuel that can be converted to electrical energy by the fuel cell stack 30. The raw fuel can comprise sulfur containing molecules or various other anode-poisoning substances that can degrade operational performance of fuel cell anodes. As will be discussed in further detail below, the fuel cell system 10 provides functionality to substantially prevent anode degradation by sulfur-containing molecules and by other anode poisoning substances and to generate energy at high theoretical efficiency levels as modeled by the Nernst equation above by providing reactants to the fuel cell anode at high partial pressures levels.

Figure 2:
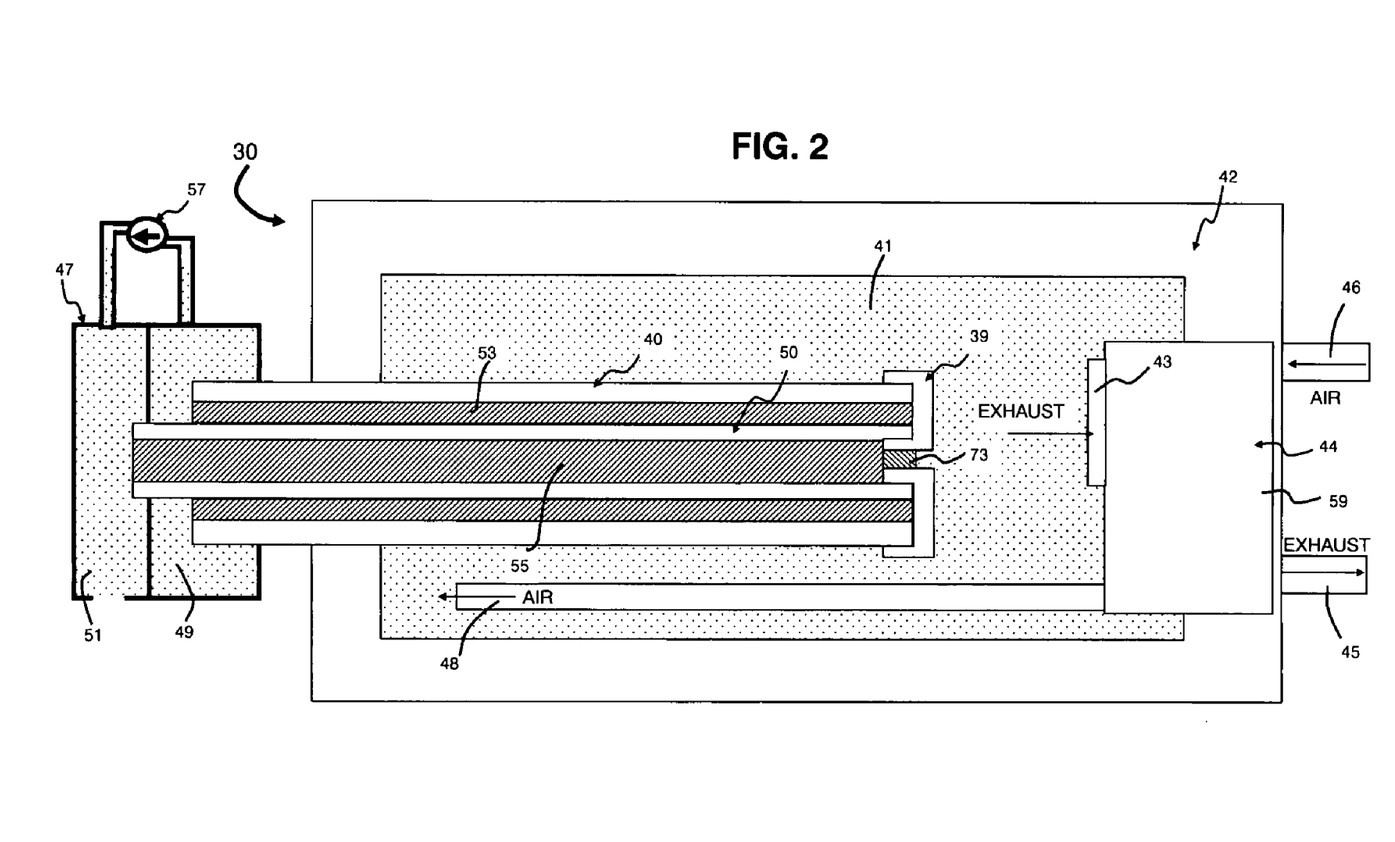
FIG. 2 depicts a cross sectional view of a fuel cell stack of the fuel cell system of FIG. 1.
Figure 3:
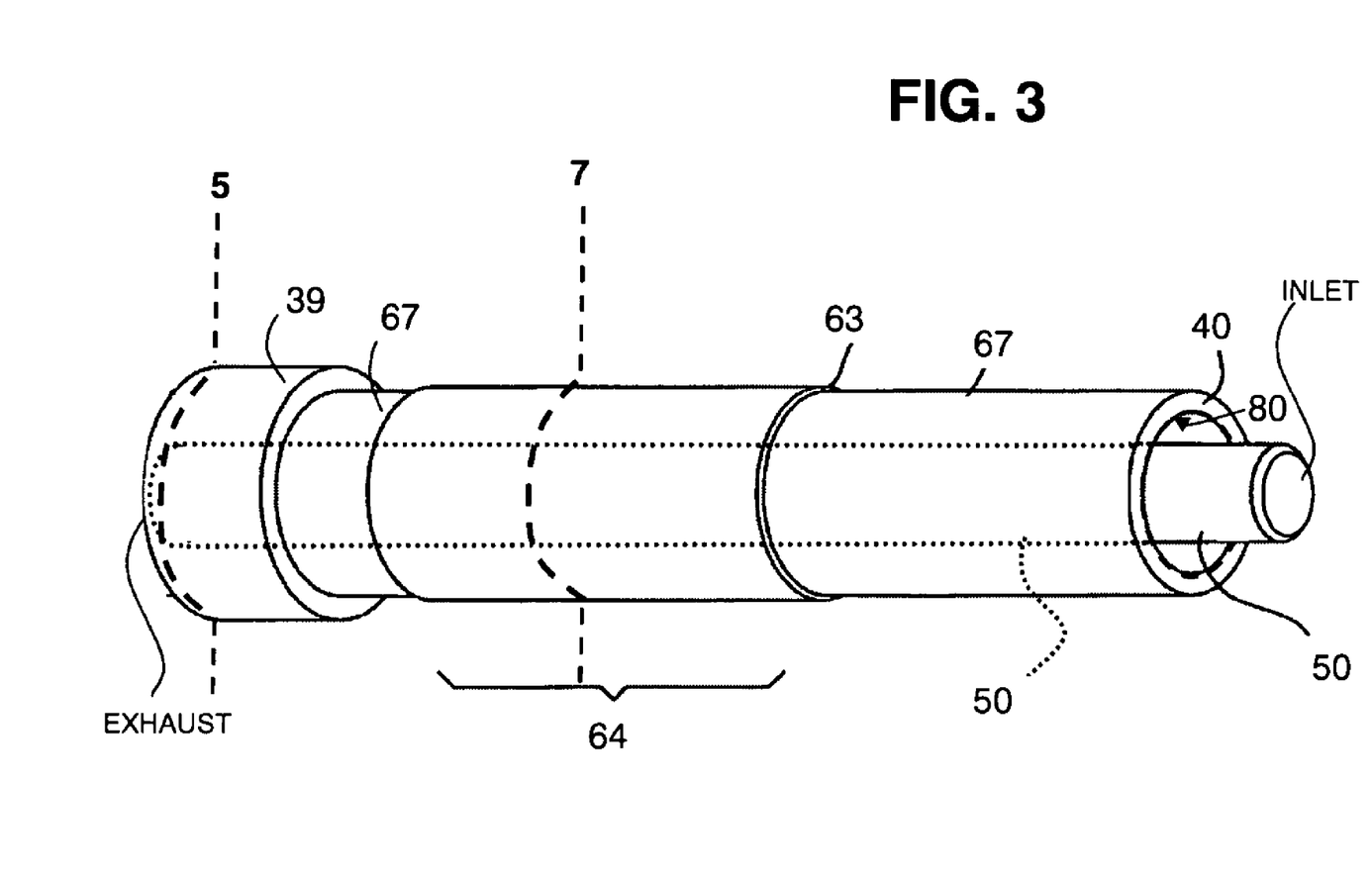
FIG. 3 depicts a prospective view of a hydrogen separation member, a fuel cell, and a cap member of the fuel cell stack of FIG. 2.

Referring to FIGS. 1-3, the fuel cell stack 30 converts raw fuel supplied from the fuel tank 36 to electrical energy supplied to the power bus 24. The fuel cell stack 30 includes a fuel cell 40, a hydrogen separation member 50, a fluid reservoir 47, a pump 57, an insulative body 42, a recuperator 44, and a cap member 39.

An inner circumference of the hydrogen separation member 50 defines a raw fuel chamber 55. As depicted in FIG. 3, the hydrogen separation member 50 generally comprises an inlet end ('INLET') at which a fuel stream enters the raw fuel chamber 55 and an exhaust end ('EXHAUST') at which an exhaust stream exits the raw fuel chamber 55.

An outer circumference of the hydrogen separation member 50, an inner circumference of the fuel cell 40, and the cap member 39 define a hydrogen gas chamber 53. The fluid reservoir 47 includes a recyclate chamber 49, a fuel mixing chamber 51 and a pump 57 disposed in a conduit between the recyclate chamber 49 and the fuel mixing chamber 51. In an alternate embodiment, the recyclate can be transferred to a fuel mixing chamber passively without the use of a pump. The recyclate chamber 49 is coupled to the fuel cell 40 such that the hydrogen gas chamber 53 is in fluid communication with the recyclate chamber 49. The fuel mixing chamber 51 is coupled to the hydrogen separation member 50 such that the raw fuel chamber 55 is in direct fluid communication with the fuel mixing chamber 51. In alternate embodiments, the recyclate can be routed to other locations within the fuel cell system 30, for example, the recyclate can be routed to through a heat exchanger such that heat can be exchanged between the recyclate stream and other fluid streams of the fuel cell 40.

In one embodiment, the fluid reservoir 47 is formed from plastic material, and the hydrogen separation member 50 and the fuel cell 40 are sealed to the fluid reservoir 47 utilizing a silicone containing sealant. Although the fluid reservoir 47 is depicted as receiving recyclate from a single fuel cell 40 and routing fuel to a single proton conducting membrane 50, the fluid reservoir 47 can comprise a manifold system that can receive recyclate from and can distribute fuel to multiple fuel cells.

The recyclate chamber 49 receives fuel recyclate comprising water vapor and unreacted hydrogen gas from the fuel cell 40. The pump 57 drives fluid transport of the recyclate from the recyclate chamber 49 to the fuel mixing chamber 51 where the recyclate mixes with fuel from the fuel tank 36 and with ambient air. In an alternative embodiment, the unutilized hydrogen and the water produced by the anode reaction is not recycled and can be outputted through an exhaust stream.

The insulative body 42 defines an insulative cavity 41. The fuel cell 40 and the recuperator 44 are disposed within the insulative cavity 41. The insulative body 42 comprises a porous thermally insulative material capable of withstanding the operating temperatures of the fuel cell 40, that is, temperatures of up to 1000 degrees Celsius. Exemplary materials for the insulative body 42 can include high-temperature, ceramic-based material comprising, for example, high-surface area foam, mat-materials, and fibers formed from, for example, alumina, silica, and like materials.

The recuperator 44 is provided to transfer heat from the exhaust gases generated at the fuel cell 40 and the hydrogen separation member 50 to the atmospheric air utilized as an oxidant source for the fuel cell 40 and the hydrogen separation member 50 entering the fuel cell stack 30. In an alternate embodiment, heat exchangers can be utilized to transfer heat between other fluid streams. For example heat exchangers may be utilized to transfer heat from the exhaust to the fuel or the recyclate. Further, a heat exchanger can be utilized to transfer heat to and from the recyclate. In one embodiment, heat from the exhaust is utilized to heat a combined recyclate and raw fuel stream. In one embodiment, heat is transferred away from the recyclate stream such that the recyclate stream can be cooled for storage. The recuperator 44 includes an air inlet 46, an air outlet 48, an exhaust inlet 43, an exhaust outlet 45 and a heat exchange manifold 59. The air inlet 46 receives atmospheric air ('AIR') and routes the atmospheric air to the heat exchange manifold 59. The exhaust inlet 43 receives the exhaust gasses ('EXHAUST') from the insulative cavity 41 and routes the exhaust gasses to the heat exchange manifold 59. The heat exchange manifold 59 comprises a material having a high thermal conductivity such as a high temperature metal material, for example, stainless steel. The heat exchange manifold 59 comprises walls defining multiple integrated passageways. The walls of the heat exchange manifold 59 have air streams and exhaust steams flowing on each opposite side, such that the walls conduct heat from the exhaust stream to the air stream. The cooled exhaust stream exits the exhaust outlet 45 and the heated air stream exits the air outlet 48 into the insulative cavity 41.

An air pump (not shown) pumps ambient air through the recuperator 44 and into the fuel cell stack 30 and an exhaust fan (not shown) pulls exhaust gases ('EXHAUST') away from the fuel cell stack 30. The ambient air from the recuperator 44 is provided to a cathode 63 of the fuel cell 40. Further, a separate source of ambient air is provided to an anode 61 of the fuel cell 40 with a sub-stoichiometric quantity of oxygen with respect to fuel provided form the fuel tank 36.

In one alternative embodiment, when reaching a steady state operating mode, substantially all the hydrogen produced in the fuel reforming reactions is produced utilizing steam reforming reactions. In one embodiment, substantially all the water required for the steam reforming reactions is provided by the water produced at the fuel cell anode. Therefore, an external source of oxygen is not required when the water supplied from the anode reaction products is available in sufficient amounts for fuel reformation. In another alternative embodiment, a supplemental water source can be introduced into the raw fuel stream. The supplemental water as used herein refers to a water other than the water produced at the anode 61. In one embodiment, the supplemental water source includes water in a water storage tank (not shown).

Figure 4:
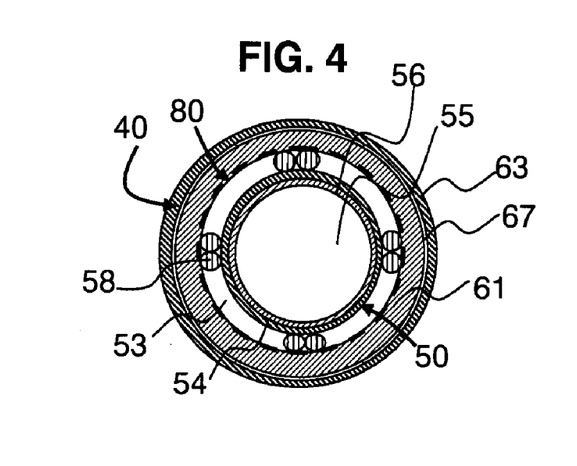
FIG. 4 depicts a cross sectional view of the hydrogen separation member and the fuel cell of FIG. 3 at a first location.

Referring to FIGS. 2-4, the hydrogen separation member 50 can selectively transport hydrogen across a barrier that is impermeable to other molecular species. In an exemplary embodiment, the hydrogen separation membrane is a hydrogen conducting membrane that transports hydrogen protons by conducting the protons across the barrier. In one embodiment, the hydrogen separation member 50 comprises a gas impermeable hydrogen purification membrane, for example a palladium hydrogen purification membrane. Gas impermeable, as used herein refers to a barrier through which molecular species such as diatomic hydrogen, oxygen, and nitrogen, along with carbon dioxide, and water vapor cannot pass. Further, the membrane is impermeable to ionic species with the exception of protons (that is, ionic hydrogen).

Referring to FIG. 4, which depicts a cross section of the fuel cell 40 along a plane 7 (depicted in FIG. 3), the hydrogen separation member 50 includes a support layer 56 and a proton conducting layer 54. The exemplary proton-conducting membrane 50 comprises a tubular shape in which a proton conducting layer 54 is disposed circumferentially around the support layer 56, and protons generally migrate from the inside of the tubular shape to the outside of the tubular shape. However, in alternative embodiments, the hydrogen separation member can comprise other shapes and can be configured such that protons flow in alternative flow directions. Further in an exemplary embodiment, the hydrogen separation member 50 conducts electrons and protons without utilizing an external electrical power source to drive conduction.

In embodiments of the present disclosure, several different materials are contemplated for utilization in the hydrogen separation member. Further, the different materials that function to separate hydrogen in the hydrogen separation member may operate utilizing different mechanism, and the specific mechanism for hydrogen separation is not limiting on the scope of the present disclosure. In an exemplary embodiment, the proton conducting layer 54 comprises a proton conducting carrier (not shown) and an electron conducting matrix (not shown). An exemplary proton conducting carrier comprises a perovskite material. Various perovskite materials can conduct protons within the operating environment and temperatures of the hydrogen separation member 50 while being tolerant to various hydrocarbon fuels including sulfur-containing fuels. When utilized to provide hydrogen to a solid oxide fuel cell, the hydrogen separation member 50 can be exposed to various fuel gasses, and to operating temperatures of 500 degrees Celsius to 1,000 degrees Celsius. Perovskite materials can be represented by the general formula $AB_{1-x}M_xO_{3-\delta}$ (where A is a divalent cation such as Sr or Ba, B is Ce or Zr, M is a fixed-valent dopant such as Y, Yb, Nd, or Gd), and proton conduction within the perovskite material can be induced through the substitution of trivalent dopant ions on the B site. This substitution results in the formation of vacant oxygen sites, or in oxidizing atmospheres, the creation of electron holes. Mobile protons can then be introduced through the uptake hydrogen ions that are generated at the fuel reforming catalysts. In alternate embodiments, hydrogen can be separated utilizing membranes that function utilizing various other mechanisms. In one embodiment, hydrogen migrates between a first side and a second side of membrane comprising a lattice structure by migrating between interstitial sites of the lattice structure.

In one embodiment, the proton conducting carrier comprises $BaCeO_3$-based material. In another embodiment, the proton conducting carrier comprises $BaZrO_3$-based material. In another embodiment, the proton conducting carrier 50 comprises a $Ba(Ce, Zr)O_3$, wherein the combination of cerium and zirconium within the proton conducting carrier provides high levels of proton conductivity and chemical stability within the operating environment of hydrogen separation member 50. In another embodiment, the proton conducting carrier comprises $Ba(Ce, Zr, Y)O_3$, wherein the combination of cerium, zirconium, and yttrium within the proton conducting carrier provides high levels of proton conductivity and chemical stability within the operating environment of the hydrogen separation member 50. The precise composition of the hydrogen separation member can be selected based on the specific fuel utilized within the raw fuel chamber 55 and based on a desired hydrogen flux rate through the hydrogen separation member 50.

In other embodiments, hydrogen separation members comprise a hydrogen separation layer including palladium or a palladium alloy in addition or instead of the proton conducting layer 54. Exemplary palladium alloys can comprise palladium along with one or more of titanium, copper, silver, vanadium, yttrium. In one embodiment, a hydrogen separation member includes a hydrogen separation layer comprising an alloy including zinc and nickel.

In other embodiments, hydrogen separation members comprise multiple hydrogen separation layers. For example, the hydrogen separation member can comprise both a hydrogen conducting layer comprising $BaCeO_3$ and a hydrogen separation layer comprising palladium.

The electrically conductive matrix of the proton conducting layer 54 can comprise a conductive material compatible with the operating environment of the hydrogen separation member 50. In an exemplary embodiment, the electrically conductive matrix comprises primarily nickel metal. In an alternative exemplary embodiment, the electrically conductive matrix comprises a palladium or a nickel-palladium matrix. The electrically conductive matrix can further comprise dopants to increase the durability of the electrically conductive matrix. The desired ratio of the electrically conductive matrix material to proton conducting carrier material for conducting hydrogen ions across the hydrogen separation member 50 can be determined based on the percolation limit, the proton conductivity of the proton conducting carrier, and the electrical conductivity of the electrically conductive matrix.

The support layer 56 comprises porous material generally compatible with proton conducting layer 54 (including compatible with thermal expansion properties and including low reactivity) and with the operating environment of the hydrogen separation member 50. In an exemplary embodiment, the support layer comprises the same or similar material to that of the proton conducting carrier of the hydrogen separation member 50. In one embodiment, the support layer 56 comprises porous $BaZrO_3$ and the proton conducting layer 54 comprises a dense layer comprising $[Ba(Zr_{0.8-x}Ce_xY0.2)O_3-a]$ proton carrier and a nickel electron conducting matrix.

In alternate embodiment, the support material can comprise other material, for example, ceramic materials such as alumina and zirconia.

A sulfur-tolerant fuel reforming catalyst (not shown) is dispersed throughout the support layer 56. "Sulfur-tolerant catalyst" is used herein to describe a catalyst that does not lose its effectiveness in catalyzing a hydrocarbon reformation reaction primarily due to chemical interaction with sulfur-containing compounds. In other words, sulfur-tolerant catalysts will experience degradation of catalytic performance over time under normal operating conditions at substantially similar rates when exposed to sulfur containing hydrocarbon fuels (for example, fuels having 50 ppm sulfur containing compounds) and when exposed to sulfur-free hydrocarbon fuels (for example, fuel having 0 ppm sulfur containing compounds).

Exemplary sulfur-tolerant fuel reforming catalysts includes a metallic catalyst such as Rh, Rh—Pt, and Pt supported on a catalytic support material such as materials comprising $Gd_2O_3$—$CeO_2$ and materials comprising $ZrO_2$—$CeO_2$. In an exemplary embodiment, the fuel reforming catalyst comprises about 1 to about 5 weight percent metallic catalyst on a support material. In one exemplary embodiment, the catalytic support material comprises gadolinium and cerium and in particular, comprises $Gd_{0.1}Ce_{0.9}O_{1.9}$. In another exemplary embodiment, the catalytic support material comprises zirconium and cerium and in particular, comprises $Zr_{0.25}Ce_{0.75}O_2$. In another exemplary embodiment, the catalytic support material comprises ceria and alumina. In one exemplary embodiment, the catalytic support material comprises alumina.

Further, additives such as promoters and sacrificial component can be utilized to improve sulfur-tolerance and decrease coking of the fuel reforming catalyst. Exemplary additives include $Y_2O_3$, CuO, K, and Ru.

The hydrogen separation member 50 can be formed utilizing one of several ceramic forming methods. In an exemplary embodiment, a precursor material can be formed having thermoplastic binders with ceramic powders disposed therein wherein the thermoplastic binders can be burned off and the ceramic powders can subsequently be sintered and densified. The precursor material can include a precursor support layer and a precursor proton conducting layer. The precursor support layer can include fugitive material, for example, carbon black, that can be burned off to provide a desired pore structure in the post-sintered support layer 56.

In an exemplary embodiment, the hydrogen separation member 50 is formed as a tube. The precursor support layer and the precursor proton conducting layer can be co-extruded and co-sintered utilizing, for example, a process described in U.S. Pat. No. 6,749,799, the entire contents of which is hereby incorporated by reference herein. In an exemplary embodiment, the proton conducting layer 54 can have a thickness, within a range of about 2 to 20 micrometers, and the support layer 56 can have a thickness within a range of about 300 micrometers.

In an exemplary embodiment, the sulfur-tolerant fuel reforming catalysts can be applied to the support layer 56 utilizing a wash-coating process, for example, by wash coating a slurry including the catalyst support material on the support layer to form a coating layer, and then loading a noble metal catalyst on the coating layer by adsorption (wet impregnation) or water absorption (incipient wetness impregnation). In alternative embodiments, the exemplary sulfur-tolerant fuel reforming catalyst can be by applied by other means including other application means for applying catalysts to post-sintered ceramics along with forming the catalysts within the pre-sintered precursor support material. In an exemplary embodiment, in addition to being sulfur tolerant, the fuel reforming catalyst is also resistant to poisoning by other substances in the fuel and resistant to coking.

In alternative embodiments, fuel reforming can take place at other locations within the fuel cell system. Thus, the raw fuel comprises hydrogen along with other components such as oxygen, nitrogen, carbon containing molecules, and sulfur-containing molecules are then processed by the hydrogen conducting membrane. In one embodiment, fuel reforming takes place within a fuel reforming reactor disposed within the fuel cell stack 30. In one embodiment, the fuel reforming takes place within a fuel reforming reactor disposed outside the fuel cell stack 30.

In an exemplary embodiment, the fuel cell 40 is a solid oxide fuel cell that provides ion conducting capability for transporting oxygen ions through a solid electrolyte 67 from the cathode 63 to the anode 61 within an active area at operating temperatures in a range of 500 degrees Celsius to 1,000 degrees Celsius.

Figure 5:
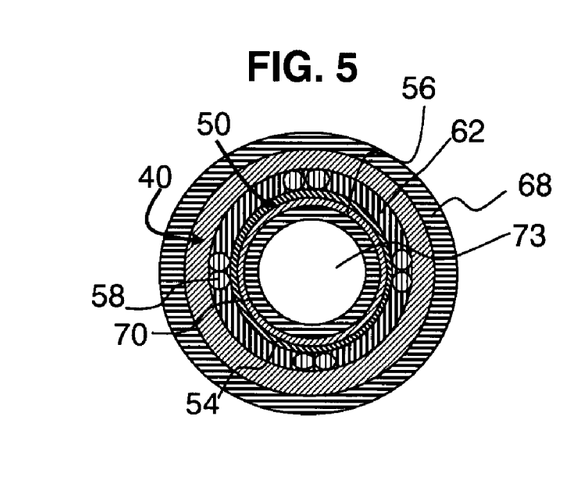
FIG. 5 depicts a cross sectional view of the hydrogen separation member, the fuel cell and the cap member of FIG. 3 at a second location.

The anode 61 and the cap member 39 define an anode chamber 80. The hydrogen gas chamber 53, the hydrogen separation member 50, and the raw fuel chamber 55 are each contained within the anode chamber 80. Anode chamber as used herein refers to the fuel-receiving portion of each fuel cell of a fuel stack that is at least partially defined by a fuel cell anode.

Exemplary materials for the electrolyte 67 include zirconium-based materials and cerium-based materials such as yttria-stabilized zirconia and gadolinium doped ceria, and can further include various other dopants and modifiers to affect ion conducting properties. The anode 61 and the cathode 63, which form phase boundaries (gas/electrolyte/electrode particle; commonly known as triple points) with the electrolyte 67, are disposed on opposite sides of the electrolyte 67 with respect to each other. The anode 61 and electrolyte 67 may be formed together by coextrusion as described in U.S. Pat. No. 6,749,799. Alternatively, the anode may be formed first and the electrolyte and cathode added in later steps. In general, the anode 61 and cathode 63 are formed of porous materials capable of functioning as an electrical conductor and capable of facilitating the appropriate reactions. The porosity of these materials allows dual directional flow of gases (e.g., to admit the fuel or oxidant gases and permit exit of the byproduct gases).

The anode 61 comprises an electrically conductive cermet that is chemically stable in a reducing environment. In an exemplary embodiment, the anode comprises a conductive metal such as nickel, disposed within a ceramic skeleton, such as yttria-stabilized zirconia. The cathode comprises a conductive material chemically stable in an oxidizing environment. In an exemplary embodiment, the cathode comprises a perovskite material and specifically lanthanum strontium cobalt ferrite (LSCF). In an exemplary embodiment, the anode 61 has a thickness within a range, of about 300 micrometers, which provides structural support for the fuel cell components, the electrolyte 67 has a thickness, within a range of about 10 micrometers, and the cathode 63 has a thickness within a range of about 50 micrometers.

An anode current carrier 58 is electrically connected to the anode 61 to collect current from the anode 61 and route current from the anode 61. In an exemplary embodiment, the anode current carrier 58 comprises wires longitudinally disposed along the length of the anode. In alternative embodiments, the current collector 58 can comprise a variety of shapes such as wires, brushes, grids, and like shapes, and can be disposed in various configurations to collect electrons from the anode 61. The current collector 58 can comprise various materials chemically resistive to the high operating temperatures and the hydrogen and water present in the hydrogen gas chamber 53. In an exemplary embodiment, the anode current carrier 58 comprises nickel.

Figure 6:
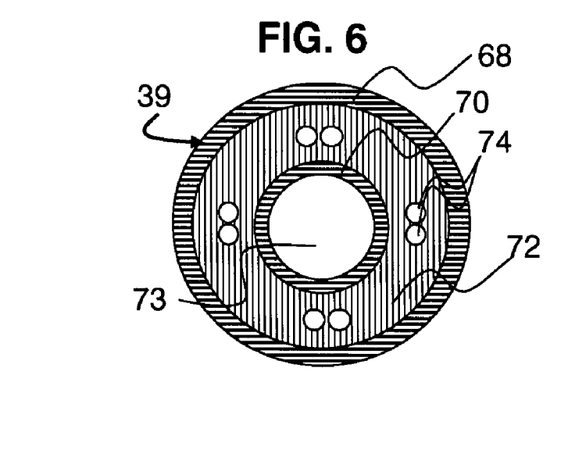
FIG. 6 depicts a top view of the cap member of FIG. 3.
Figure 7:
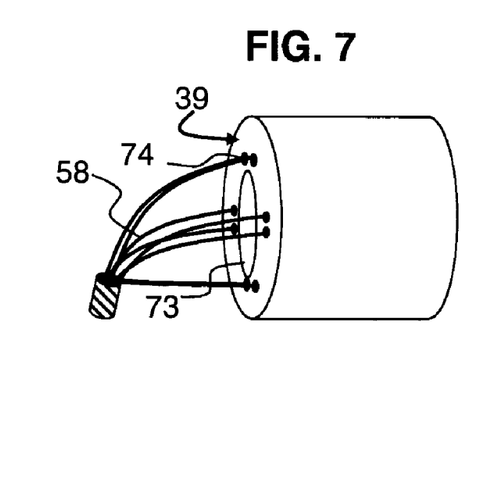
FIG. 7 depicts a prospective view of the cap member of FIG. 3.

Referring to FIG. 5, which depicts a cross-sectional view across the plane '5' of FIG. 3, FIG. 6 which depicts a top view of the cap member 39 and FIG. 7, which depicts a prospective view of the cap member 39, the cap member 39 is coupled to the exhaust end of the hydrogen separation member 50 and the fuel cell 50 to prevent fluid from exiting the hydrogen gas chamber 53 at the exhaust end. The cap member 39 includes a base wall 72 an inner wall 70 and an outer wall 68. Holes 74 are disposed through the base wall 72 for the current collector 58, therethrough. In an exemplary embodiment, the cap member 39 comprises a conductive material and provides anode current collecting functionality. In one embodiment, the cap member 39 comprises stainless steel.

The hydrogen separation member 50 is disposed circumferentially around and adjacent to the inner wall 70. A contact layer 62 is disposed circumferentially around the hydrogen separation member 50. In an exemplary embodiment, the contact layer 62 can both collect current from the anode 61 and can physically bond the cap member 39, the fuel cell 40 and the hydrogen separation member 50. The exemplary conductive layer 62 can include any one of a variety conductive materials, for example, a silver or a silver alloy that is physically bonded to the inner circumference of the fuel cell, the base wall 72 of the cap member 39 and the outer circumference of the hydrogen separation member 50. In another alternative embodiment, the contact layer comprises material having low conductivity and current is primarily conducted through the anode current carrier 58. Exemplary current collecting concepts can are described in U.S. patent application Ser. No. 11/566,457 entitled SOLID OXIDE FUEL CELL WITH IMPROVED CURRENT COLLECTION and U.S. patent application Ser. No. 12/044,355 entitled CLAD COPPER WIRE HAVING ENVIRONMENTALLY ISOLATING ALLOY the entire contents of both are hereby incorporated by reference herein.

Figure 8:
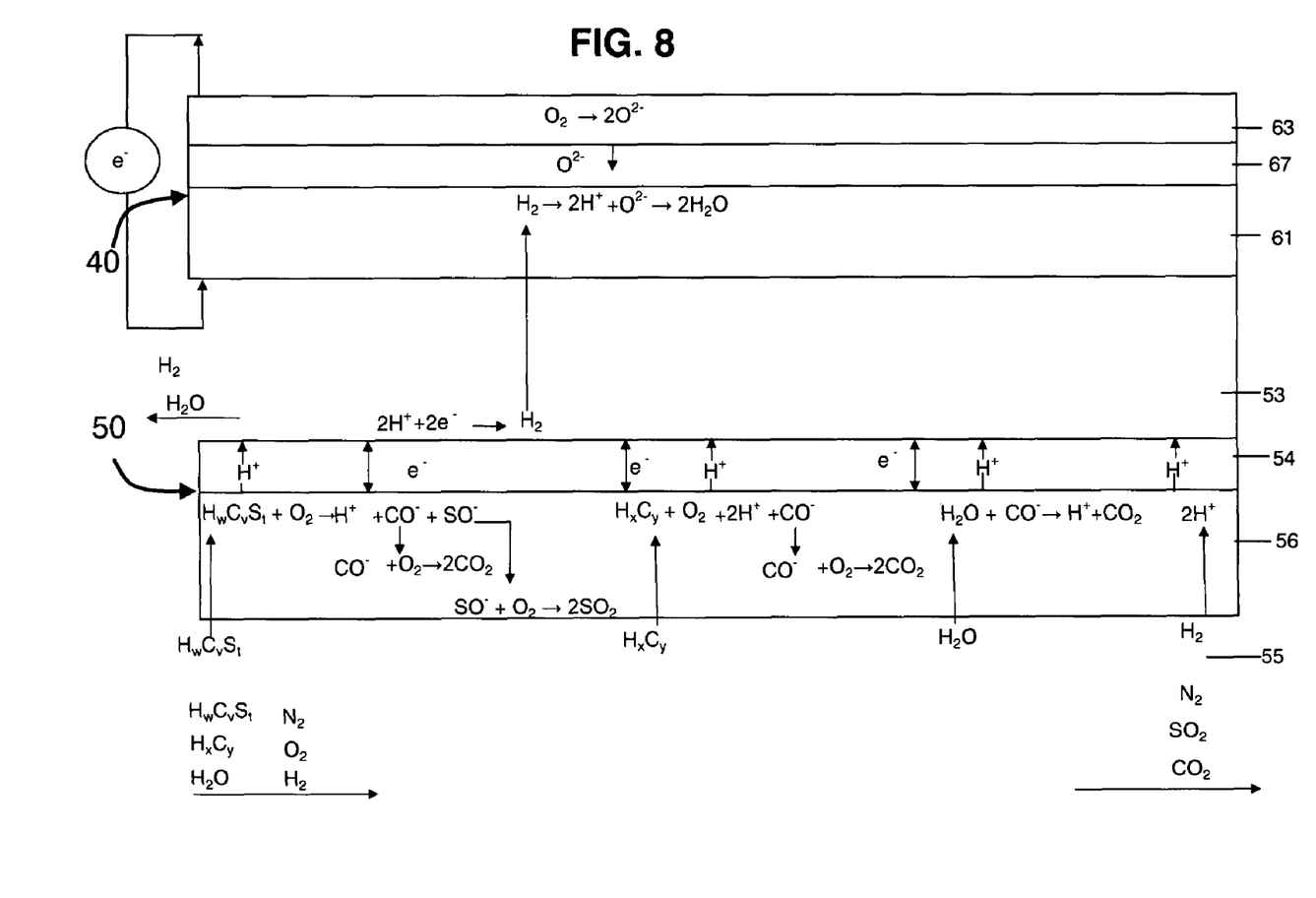
FIG. 8 depicts a cross sectional view of a hydrogen separation member and a fuel cell in accordance with an exemplary embodiment of the present disclosure.

FIG. 8 depicts potential chemical reactions taking place at the hydrogen separation member 50 and at the fuel cell 40. A feed stream into the raw fuel chamber 55 includes hydrocarbon (generally depicted as '$H_xC_y$'), sulfur containing molecules (generally depicted as '$H_xC_yS_t$') oxygen ('$O_2$') and nitrogen ('$N_2$') fed from atmospheric air, and hydrogen $H_2$ and water $H_2O$ from the fuel cell recyclate. Although the hydrocarbons are generally depicted as $H_xC_y$, and the sulfur containing molecules are generally depicted as $H_xC_yS_t$, it is to be understood that the fuel stream can have hydrocarbons and sulfur containing molecules that deviate from the generally formulas, for example by containing oxygen. Further, it is to be understood that although FIG. 8 depicts ionic species as reactants and reaction products for illustration purposes, in some embodiments, the reactions can occur without forming ionic species. Further, FIG. 8 depicts hydrogen as being transported across the membrane 54 as ionic hydrogen, wherein in alternative embodiments, hydrogen can be transported across the hydrogen separation member 50 without being ionized.

The reformation catalyst within the support within the support layer 56 reforms hydrocarbons and sulfur containing molecules. Further, the reformation catalysts within the support layer 56 can induce a water gas shift reaction wherein water reacts with carbon monoxide to form hydrogen and hydrogen can be ionized.

Further, CO— can be fully oxidized by reacting with oxygen and SO— can be fully oxidized by reacting with oxygen. The proton conducting layer 54 of the hydrogen separation member 50 conducts hydrogen ions from the support layer 56 to the hydrogen gas chamber 53. The hydrogen separation layer also conducting electrons ('$e^-$'). However, molecules present in the raw fuel chamber 55 for example, $H_wC_vS_t$, $H_xC_y$, $N_2$, $SO_2$, $CO_2$, CO, SO, $H_2$, $O_2$ are not transported from the raw fuel chamber 55 to the hydrogen gas chamber 53.

Therefore, these components are not exposed to the fuel cell anode 61 and do not degrade operational efficiency of the fuel cell anode.

In one embodiment, the hydrogen separation member 50 comprises a non-uniform composition. For example, the fuel reforming catalyst can be selectively loaded or graded on the hydrogen separation member 50. The non-uniform composition can be designed to selectively provide higher levels of fuel reforming reactions near the inlet end of the hydrogen separation member 50 and can provide higher levels of proton conducting near the exhaust end of the hydrogen separation member 50.

After being conducted through the proton conducting layer 54, the hydrogen ions (H$^+$) recombine with electrons (e$^-$) to produce hydrogen gas. The hydrogen gas is routed to the fuel cell anode 61 where it reacts with oxygen conducted through the electrolyte 67 to generate water vapor (H$_2$O). The oxidation of the hydrogen gas at the fuel cell anode 61 along with oxygen reducing reactions at the fuel cell cathode 63, drive an electromotive force across the electrolyte 67.

The recyclate comprising water vapor and unutilized hydrogen exits the hydrogen gas chamber 53 and is routed to the recyclate chamber 49 and then to the mixing chamber 51 where it can be recycled and reintroduced to the raw fuel chamber 55. Typically, hydrogen utilization at the fuel cell is in the range of 70%. However, since hydrogen is recycled in the fuel cell stack 30, the hydrogen utilization rate can increase above the typical hydrogen utilization range. Further, as shown in Equation 1 above, since hydrogen and water are the only molecules present in the hydrogen gas chamber 53, hydrogen partial pressure will not be lowered due to the presence of other types of molecules, thereby increasing the fuel cell operating efficiency described by the Nernst equation shown as Equation 1, above.

Figure 9:
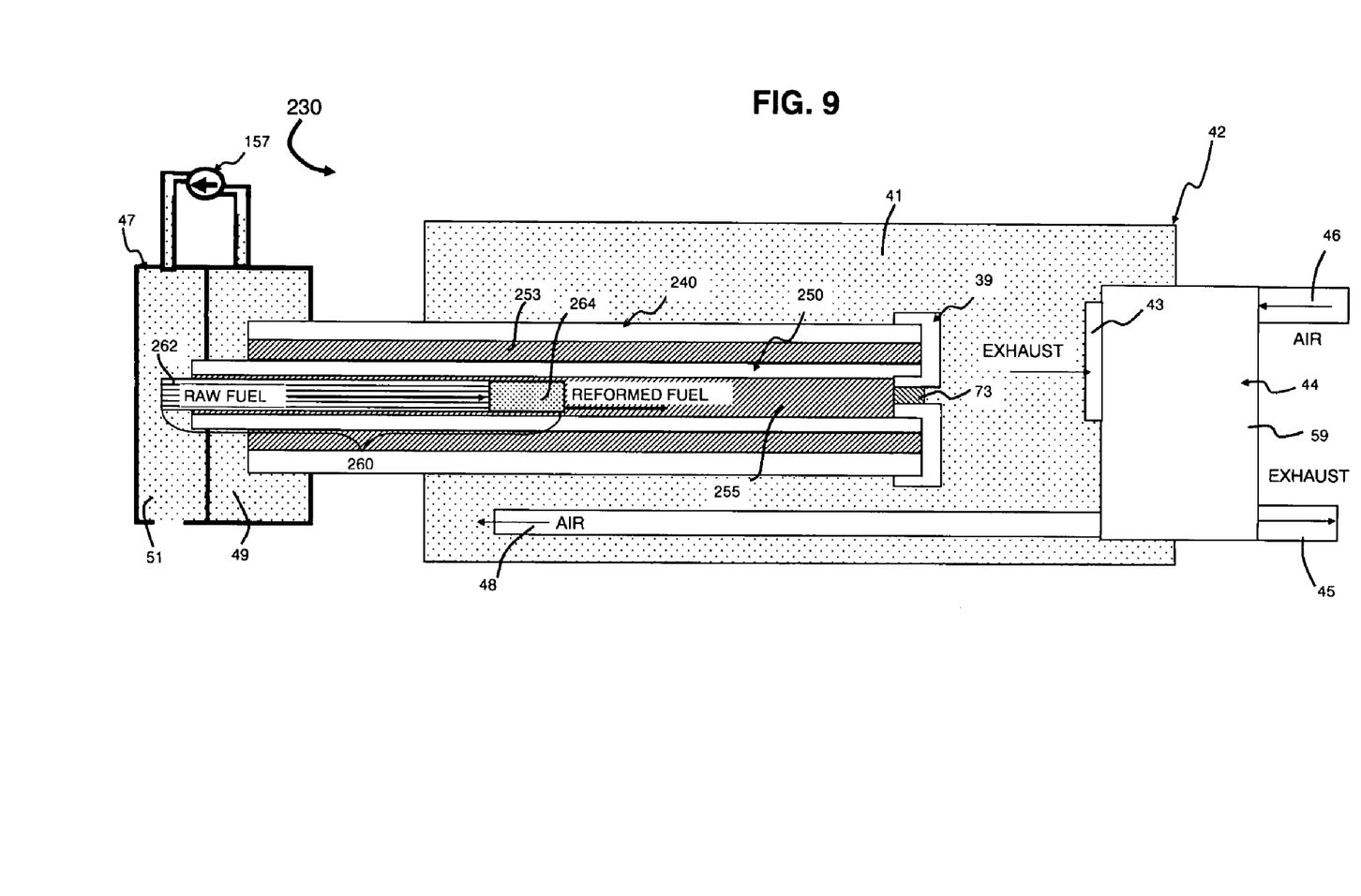
FIG. 9 depicts a cross sectional view of a fuel cell stack in accordance with another exemplary embodiment.

FIG. 9 depicts a cross section of a fuel cell stack 230 that includes the fuel cell 240, a hydrogen separation member 250, a fuel feed tube 260 and a fuel reforming reactor 264. Fuel is routed to the fuel feed tube and is reacted in the internal reforming reactor 264. The fuel feed tube 260 comprises a dense ceramic material such as alumina and zirconia. The fuel reforming reactor 264 reforms hydrocarbon fuel to hydrogen by catalyzing a partial oxidizing reaction between the hydrocarbon and oxygen. In an exemplary embodiment, the fuel reforming reactor 264 comprises a supported catalyst. The supported catalysts includes of very fine scale catalyst particles supported on a substrate. Preferably the catalytic substrate is honeycomb shaped, provided with a series of openings which the fuel gas passes through as the partial oxidation reaction is catalyzed. The fuel reforming reactor 264 can comprise, for example, particles of a suitable metal such as platinum or other noble metals such as palladium, rhodium, iridium, osmium, or their alloys disposed on a substrate which can comprise oxides (such as aluminum oxide), carbides, and nitrides such. In other embodiments, the catalytic substrate can include a wire, a porous bulk insert of a catalytically active material, or a thin "ribbon" which having a high surface area to volume ratio or the fuel reforming reactor can comprise a packed bed of catalytic substrate beads. Other materials suitable for use as a catalytic substrate will be readily apparent to those skilled in the art given the benefit of this disclosure. In one embodiment, the fuel feed tube 260 routes bulk fuel flow in a generally uniform direction past the fuel reforming reactor 264 such that substantially all the raw fuel is catalyzed within the fuel reforming reactor prior to contacting the hydrogen separation member 250.

In an exemplary embodiment, the hydrogen separation member 250 comprises a similar material composition to the hydrogen separation member 50. However, since the hydrogen separation member 250 does not provide primary fuel reformation functionality as does the hydrogen separation member 50, the hydrogen separation member 250 can comprise a lesser amount of fuel reforming catalyst than the hydrogen separation member 50.

Figure 10:
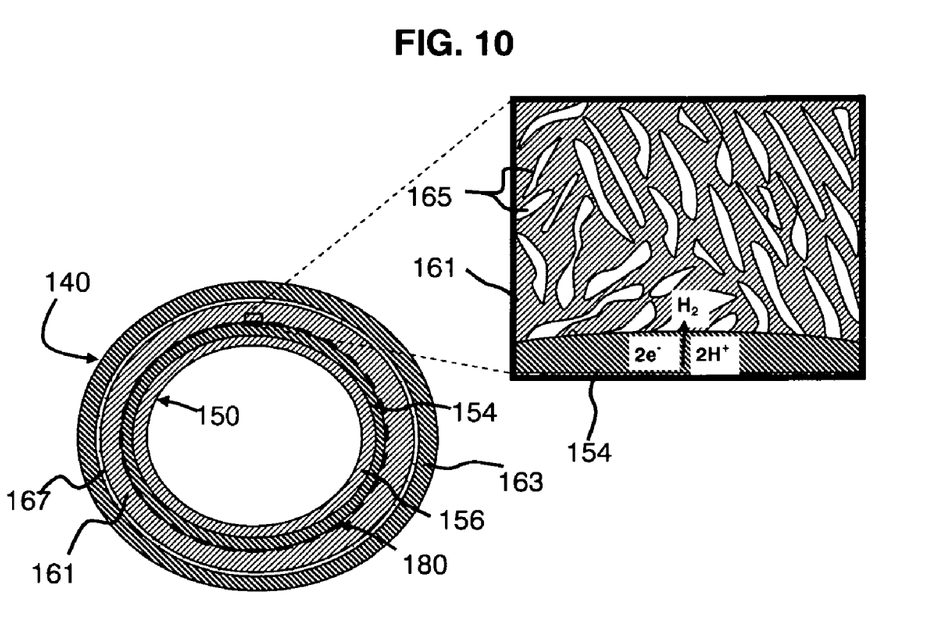
FIG. 10 depicts a cross sectional view of a hydrogen separation member and a fuel cell in accordance with an exemplary embodiment of the present disclosure.

Referring to FIG. 10, a cross section of a fuel cell 140 and a hydrogen separation member 150 in accordance with another embodiment of the present disclosure are depicted. The fuel cell 140 and the hydrogen separation member 150 can comprise substantially similar materials to the fuel cell 40 and the hydrogen separation member 50, described above. The fuel cell 140 includes an anode 161, an electrolyte 167, and a cathode 163. The hydrogen separation member 150 includes a support layer 156 and a proton conducting layer 154.

The anode 161 of the fuel cell 140 contacts the proton conducting layer 154 of the hydrogen separation member 150. The anode 161 defines an anode chamber 180 that includes the hydrogen separation member 150. The hydrogen separation member 150 reforms raw fuel utilizing reactions described above in reference to the hydrogen separation member 50. As depicted in a zoomed in view window of FIG. 10, hydrogen ions can combine with electrons to generate hydrogen gas within the porous anode 161. The hydrogen gas is routed through voids 165 and reacts with oxygen at an interface between the anode 161 and the electrolyte 167 to produce water, thereby driving an electromotive force across the electrolyte 167.

Figure 11:
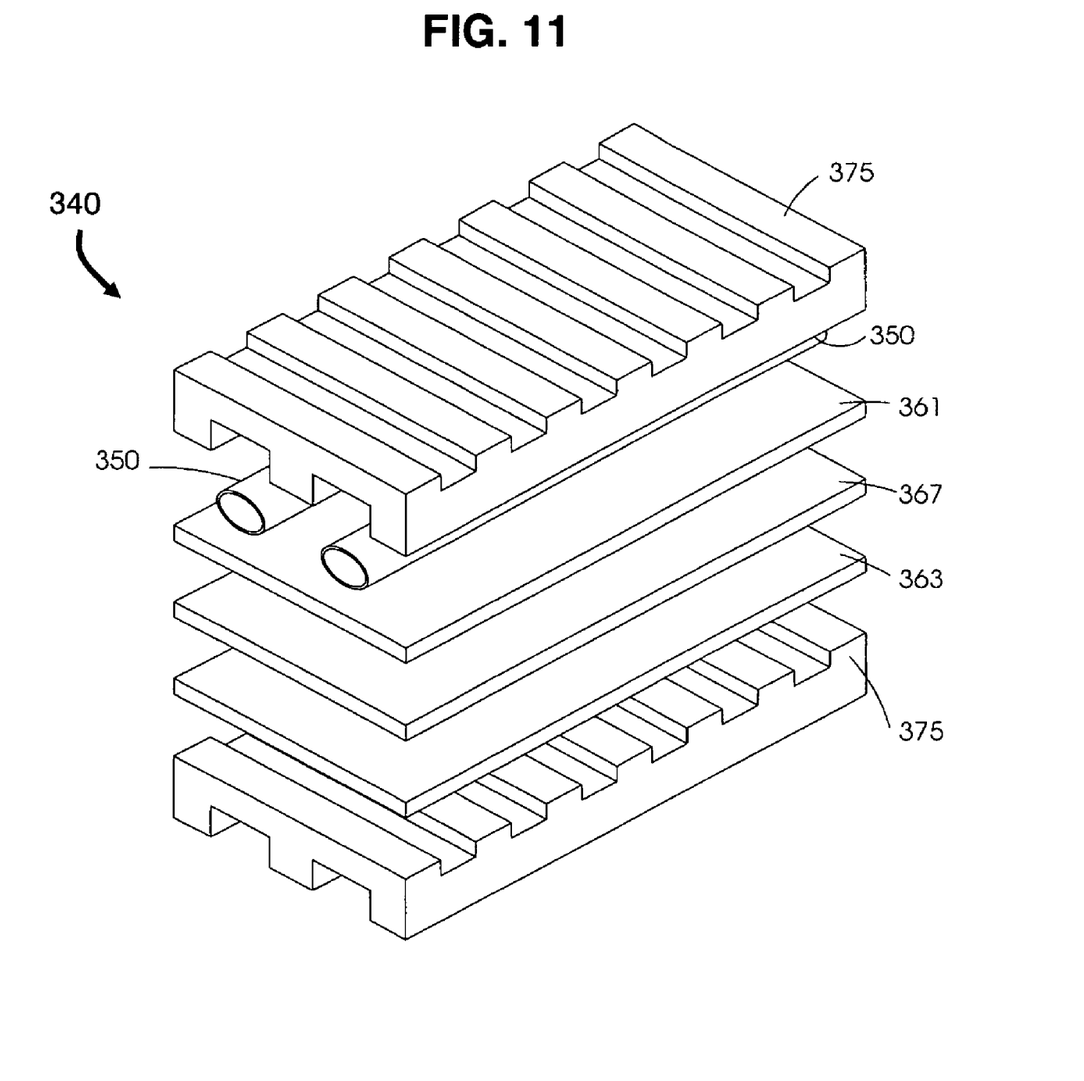
FIG. 11 depicts an expanded, prospective view of a hydrogen separation member and a planar fuel cell in accordance with another exemplary embodiment of the present disclosure.

Referring to FIG. 11, a cross section of a fuel cell 340 and a hydrogen separation member 350 in accordance with another embodiment of the present disclosure are depicted. The fuel cell 340 comprises a planar geometry and includes an anode 361, an electrolyte 367, and a cathode 363. The anode 361 is disposed in contact with the manifold 375. The fuel cell 340 and the manifold 375 define an anode chamber 380. The anode chamber 380 includes the hydrogen separation member 350 disposed therein.

The hydrogen separation member 350 reforms raw fuel utilizing reactions described above in reference to the hydrogen separation member 50. Hydrogen ions can combine with electrons to generate hydrogen. The hydrogen gas reacts with oxygen at an interface between the anode 361 and the electrolyte 367 to produce water, thereby driving an electromotive force across the electrolyte 367.

The exemplary embodiments shown in the figures and described above illustrate, but do not limit, the claimed invention. It should be understood that there is no intention to limit the invention to the specific form disclosed; rather, the invention is to cover all modifications, alternative constructions, and equivalents falling within the spirit and scope of the invention as defined in the claims. Therefore, the foregoing description should not be construed to limit the scope of the invention.

The invention claimed is:

1. A fuel cell stack configured to input raw fuel from a fuel source to produce electrical energy, said fuel cell stack comprising:
   a fuel cell comprising an anode, an electrolyte, and a cathode arranged in a generally tubular construction; said anode defining a generally hollow interior anode chamber surrounded by the electrolyte and the cathode; and
   a generally tubular hydrogen separation member disposed within the anode chamber, the hydrogen separation member having a first side and a second side, the second side proximate the anode, the first side of the hydrogen separation member defining a generally hollow interior raw fuel chamber, the hydrogen separation member being configured to conduct hydrogen from the first side outwardly toward the second side to provide hydrogen fuel to the anode of the fuel cell, while inhibiting the transportation of gas molecules between the first side and the second side.

2. The fuel cell stack of claim 1, further comprising a fuel reforming catalyst disposed on the first side of the hydrogen separation member, said fuel reforming catalyst being configured to catalyze a hydrogen proton producing reaction.

3. The fuel cell stack of claim 2, wherein the fuel reforming catalyst is configured to catalyze a reaction producing hydrogen protons from hydrocarbon fuel at reaction temperatures of 500 C to 800 C.

4. The fuel cell stack of claim 3, wherein the fuel reforming catalyst is a sulfur tolerant catalyst.

5. The fuel cell stack of claim 3, wherein the fuel reforming catalyst comprises at least one of rhodium and platinum.

6. The fuel cell stack of claim 1, wherein the hydrogen separation member comprises a porous support layer and a gas impermeable proton conducting layer.

7. The fuel cell stack of claim 6, wherein the hydrogen separation member comprises nickel, barium, zirconium, cerium, and yttrium.

8. The fuel cell stack of claim 1, wherein the hydrogen separation member comprises a ceramic.

9. The fuel cell stack of claim 8, wherein the hydrogen separation member comprises at least one of cerium, zirconium and gadolinium.

10. The fuel cell stack of claim 1, wherein the second side of the hydrogen separation member and the anode of the fuel cell define a hydrogen gas chamber.

11. The fuel cell stack of claim 10, wherein molecular transport from the outlet of the raw fuel chamber to the hydrogen gas chamber is substantially prohibited.

12. The fuel cell stack of claim 11, wherein the hydrogen gas chamber is physically isolated from the outlet of the raw fuel chamber.

13. The fuel cell stack of claim 10, wherein the hydrogen separation member is spaced apart from the anode.

14. The fuel cell stack of claim 10, comprising a cap member providing a gas flow barrier between the hydrogen gas chamber and the outlet of raw fuel chamber.

15. The fuel cell stack of claim 1, wherein the fuel cell is a solid oxide fuel cell.

16. The fuel cell stack of claim 1, wherein the hydrogen separation member is configured to receive sulfur-containing fuel at the first side of the member and provide substantially sulfur-free fuel to the anode of the fuel cell.

17. The fuel cell stack of claim 1, where the hydrogen separation member is configured to receive nitrogen at the first side of the member and provide substantially nitrogen free fuel to the anode of the fuel cell.

18. The fuel cell stack of claim 1, wherein the hydrogen separation member is configured to catalyze carbon dioxide producing reactions and to provide substantially carbon dioxide free fuel to the anode of the fuel cell.

19. The fuel cell stack of claim 1, wherein the hydrogen separation member is conductive of electrons.

* * * * *